(12) United States Patent
Seok et al.

(10) Patent No.: US 8,644,281 B2
(45) Date of Patent: Feb. 4, 2014

(54) METHOD AND APPARATUS OF ACCESSING CHANNEL IN WIRELESS COMMUNICATION SYSTEM

(75) Inventors: Yong Ho Seok, Anyang-si (KR); Eun Sun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 13/191,041

(22) Filed: Jul. 26, 2011

(65) Prior Publication Data
US 2012/0026997 A1 Feb. 2, 2012

Related U.S. Application Data

(60) Provisional application No. 61/367,876, filed on Jul. 27, 2010, provisional application No. 61/431,441, filed on Jan. 11, 2011, provisional application No. 61/450,626, filed on Mar. 9, 2011.

(51) Int. Cl.
*H04W 4/00* (2009.01)
(52) U.S. Cl.
USPC ......... 370/338; 455/403; 455/422.1; 455/450
(58) Field of Classification Search
USPC ........................ 370/338, 328, 310; 455/422
See application file for complete search history.

(56) References Cited

U.S. PATENT DOCUMENTS

| | | | | |
|---|---|---|---|---|
| 2008/0137627 | A1* | 6/2008 | Fischer et al. | 370/338 |
| 2011/0292919 | A1* | 12/2011 | Trainin et al. | 370/338 |
| 2012/0213204 | A1* | 8/2012 | Noh et al. | 370/331 |

OTHER PUBLICATIONS

Wentink et al., "TGz LB127 Draft 1.0 CID 38-40 (TDLS Frame Format)," CID 38-40, Jul. 15, 2008, 14 pages.
Xie et al., "Joint Multichannel CSMA," IEEE 802.11-10/0780r2, Jul. 14, 2010, 13 pages.

* cited by examiner

*Primary Examiner* — Charles C Jiang
(74) *Attorney, Agent, or Firm* — Birch, Stewart, Kolasch & Birch, LLP

(57) ABSTRACT

A method and apparatus of accessing a channel in a wireless local area network is provided. The method includes receiving, by a device, an operation element for setting up or switching at least one channel from an access point (AP), the operation element including a channel type field indicating whether the at least one channel is either a single channel or multiple channels, and the operation element including two channel center frequency segment fields indicating channel center frequency of a primary channel and a secondary channel respectively if the channel type field indicates that the at least one channel is multiple channels, determining whether the primary channel is idle during a first interval, determining whether the secondary channel is idle during a second interval if the primary channel is idle, and transmitting data by using the primary channel and the secondary channel to the AP or at least one station in a basic service set (BSS) if the primary channel and the secondary channel are idle.

3 Claims, 11 Drawing Sheets

FIG. 8

| Element ID (910) | Length (920) | Channel Type (930) | Channel Center Frequency Segment 1 (940) | Channel Center Frequency Segment 2 (950) |
|---|---|---|---|---|

900

METHOD AND APPARATUS OF ACCESSING CHANNEL IN WIRELESS COMMUNICATION SYSTEM

CROSS-REFERENCE TO RELATED APPLICATIONS

This application claims the benefit of priority of U.S. Provisional application No. 61/367,876 filed on Jul. 27, 2010, U.S. Provisional application No. 61/431,441 filed on Jan. 11, 2011, and U.S. Provisional application No. 61/450,626 filed on Mar. 9, 2011, all of which all of which are incorporated by reference in their entirety herein.

BACKGROUND OF THE INVENTION

1. Field of the Invention

The present invention relates to a wireless communication, and more particularly, to a method and apparatus of accessing a channel in a wireless communication system.

2. Related Art

With the advancement of information communication technologies, various wireless communication technologies have recently been developed. A wireless local area network (WLAN) is a technology whereby super high-speed internet access is possible in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. Initially, WLAN used a frequency of 2.4 GHz to support a data rate of 1 to 2 Mbps by using frequency hopping, spread spectrum, infrared ray communication, etc. Recently, the WLAN can support a data rate of up to 54 Mbps by using orthogonal frequency division multiplexing (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

The IEEE 802.11b standard supports a data rate of up to 11 Mbps (bits per second) by using a frequency band of 2.4 GHz. The IEEE 802.11a standard uses a frequency band of 5 GHz instead of the frequency band of 2.4 GHz and thus significantly reduces influence of interference. The IEEE 802.11a standard has improved the data rate to up to 54 Mbps by using the OFDM technology. The IEEE 802.11a standard uses a 20 MHz channel bandwidth within a bandwidth of 5 GHz. Although there are national differences, 13 channels can be used. The IEEE 802.11n standard provides increased network speed and reliability, extended coverage. The IEEE 802.11a standard uses a 20 MHz channel bandwidth or a 40 MHz channel bandwidth within a bandwidth of 5 GHz.

Basic access mechanism of an IEEE 802.11 is a carrier sense multiple access with collision avoidance (CSMA/CA) combined with binary exponential backoff. The CSMA/CA mechanism is also referred to as a distributed coordinate function (DCF) and basically employs a "listen before talk" access mechanism. A station (STA) listens a wireless medium before starting transmission. As a result of listening, if it is sensed that the wireless medium is not in use, the listening STA starts its transmission. Otherwise, if it is sensed that the wireless medium is in use, the STA does not start its transmission but enters a delay duration determined by the binary exponential backoff algorithm. The CSMA/CA channel access mechanism is not so efficient since throughput at the MAC layer provides only 50 to 60% of throughput at the physical layer.

IEEE 802.11 VHT (Very High Throughput) is one of WLAN systems which have been recently proposed to support throughput of higher than 1 Gbps. Two kinds of VHT system are independently progressed: one is IEEE 802.11 ac below 6 GHz band and another is IEEE 802.11 ac for 60 GHz band. In order to support throughput of higher than 1 Gbps, a feasibility test for 8×8 multiple-input multiple-output (MIMO) and 80 MHz channel bandwidth has been progressed. The VHT system is expected to use channel bandwidths broader than at least 80 MHz. The 80 MHz channel bandwidths can be configured by combining at least four adjacent 20 MHz channel. An AP simultaneously transmits data at different frequencies to multiple STAs to increase the overall throughput.

Meanwhile, IEEE 802.11y is an IEEE 802.11 amendment for operating the IEEE 802.11 between 3650 MHz and 3700 MHz. The IEEE 802.11y provides several key features such as contention based protocol (CBP), extended channel switch announcement (ECSA), and dependent station enablement (DSE). The extended channel switch announcement provides a mechanism for an access point to notify the stations connected to it of its intention to change channels or to change channel bandwidth. This mechanism will allow for the WLAN to continuously choose the channel that is the least noisy and the least likely to cause interference. This mechanism will also be used in the IEEE 802.11n, which will allow devices to switch between the IEEE 802.11y operation and the IEEE 802.11n operation in the 2.4 GHz and 5 GHz bands. The extended channel switch announcement also provides switching of a regulatory class. The regulatory class defines operating frequency band, transmit power limitation, etc.

The multi-band supporting protocol described above can be an essential feature of the VHT system. For the VHT system, the ECSA provided by the IEEE 802.11y needs to be enhanced. That is, for the VHT system which uses channel bandwidths broader than at least 40 MHz, a method of allocating and changing channel set is required. Also, a technique for efficiently operating a wideband VHT system is required.

SUMMARY OF THE INVENTION

The present invention provides a method and apparatus of accessing a channel to support wideband in a WLAN system.

In an aspect, a method of accessing a channel in a wireless local area network is provided. The method includes receiving, by a device, an operation element for setting up or switching at least one channel from an access point (AP), the operation element including a channel type field indicating whether the at least one channel is either a single channel or multiple channels, and the operation element including two channel center frequency segment fields indicating channel center frequency of a primary channel and a secondary channel respectively if the channel type field indicates that the at least one channel is multiple channels, determining whether the primary channel is idle during a first interval, determining whether the secondary channel is idle during a second interval if the primary channel is idle, and transmitting data by using the primary channel and the secondary channel to the AP or at least one station in a basic service set (BSS) if the primary channel and the secondary channel are idle.

The at least one channel may be multiple channels if the channel type field is set to 1.

The primary channel may be not contiguous with the secondary channel.

A bandwidth of the primary channel and the secondary channel may be 80 MHz respectively.

The at least one channel may be a single channel if the channel type field is set to 0.

The single channel may have one of bandwidth of 20 MHz, 40 MHz, 80 MHz and 160 MHz.

The operation element may be included in a channel switch announcement frame which is used by the AP to advertise a channel switch.

The operation element may be included in a beacon frame or a probe response frame.

The operation element may be included in a tunneled direct link setup (TDLS) channel switch request frame.

In another aspect, a device for accessing a channel in a wireless local area network is provided. The device includes a radio frequency (RF) unit configured for transmitting or receiving a radio signal, and a processor, coupled to the RF unit, and configured for receiving an operation element for setting up or switching at least one channel from an access point (AP), the operation element including a channel type field indicating whether the at least one channel is either a single channel or multiple channels, and the operation element including two channel center frequency segment fields indicating channel center frequency of a primary channel and a secondary channel respectively if the channel type field indicates that the at least one channel is multiple channels, determining whether the primary channel is idle during a first interval, determining whether the secondary channel is idle during a second interval if the primary channel is idle, and transmitting data by using the primary channel and the secondary channel to the AP or at least one station in a basic service set (BSS) if the primary channel and the secondary channel are idle.

In another aspect, a device for accessing a channel in a wireless local area network is provided. The device includes a radio frequency (RF) unit configured for transmitting or receiving a radio signal, and a processor, coupled to the RF unit, and configured for transmitting an operation element for setting up or switching at least one channel to at least one station in a basic service set (BSS), the operation element including a channel type field indicating whether the at least one channel is either a single channel or multiple channels, and the operation element including two channel center frequency segment fields indicating channel center frequency of a primary channel and a secondary channel respectively if the channel type field indicates that the at least one channel is multiple channels, determining whether the primary channel is idle during a first interval, determining whether the secondary channel is idle during a second interval if the primary channel is idle, and transmitting data by using the primary channel and the secondary channel to the at least one station in the BSS if the primary channel and the secondary channel are idle.

BRIEF DESCRIPTION OF THE DRAWINGS

FIG. 8 illustrates an exemplary extension channel offset information element according to an embodiment of the present invention.

DESCRIPTION OF EXEMPLARY EMBODIMENTS

Figure 1:
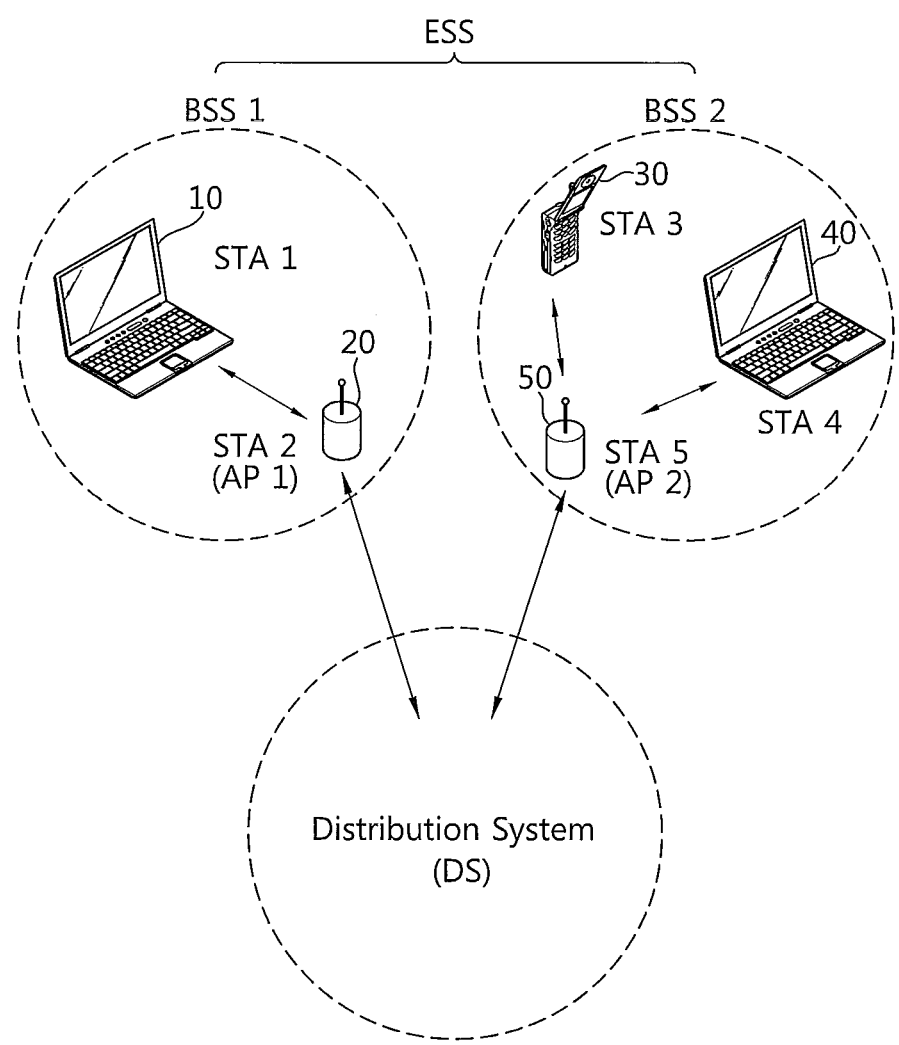
FIG. 1 is a schematic view showing an exemplary structure of a wireless local area network (WLAN) system to implement an embodiment of the present invention.

FIG. 1 is a schematic view showing an exemplary structure of a wireless local area network (WLAN) system to implement an embodiment of the present invention.

Referring to FIG. 1, the WLAN system includes one or more basis service sets (BSSs). The BSS is a set of stations (STAs) which are successfully synchronized to communicate with one another. The BSS can be classified into an infrastructure BSS and an independent BSS (IBSS). The infrastructure BSSs (BSS1 and BSS2) shown in FIG. 1 include STAs 10, 30 and 40, access points (APs) 20 and 50. The AP is a STA providing a distribution service. The APs 20 and 50 are connected by means of a distribution system (DS). The IBSS operates as Ad-hoc mode and does not include any AP. The IBSS constitutes a self-contained network since connection to the DS is not allowed. A plurality of infrastructure BSSs can be interconnected by the use of the DS. An extended service set (ESS) is a plurality of BSSs connected by the use of the DS. In the same ESS, a non-AP STA can move from on BSS to another BSS while performing seamless communication.

The STA is an arbitrary functional medium including a medium access control (MAC) and wireless-medium physical layer (PHY) interface conforming to the institute of electrical and electronics engineers (IEEE) 802.11 standard. The STA may be an AP or a non-AP STA. A non-AP STA may be a portable terminal operated by a user. The non-AP STA may be simply referred to as an STA. The non-AP STA may be referred to as a wireless transmit/receive unit (WTRU), a user equipment (UE), a mobile station (MS), a mobile terminal, a mobile subscriber unit, etc. The AP is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. The AP may be referred to as a centralized controller, a base station (BS), a node-B, a base transceiver system (BTS), a site controller, etc.

A very high throughput (VHT) WLAN system aims to be reflected on one of international mobile telecommunication (IMT)-advanced technologies corresponding to fourth-generation telecommunication standard. Accordingly, the VHT WLAN system is required to operate in IMT-Advanced candidate bands and the existing 2.4 GHz and 5 GHz bands.

The VHT WLAN system is required to use a bandwidth wider than at least 60 MHz in order to secure throughput higher than 1 Gbps. To segment a wideband into a plurality of narrowbands and use the narrowbands is efficient more than to use the wideband as a single channel in terms of backward compatibility and resource efficiency.

Hereinafter, a narrowband channel having a bandwidth of 20 MHz is referred to as a subchannel. A technique of binding three or four subchannels to support a bandwidth of 60 MHz or 80 MHz will now be described. The number of subchannels, the bandwidth of the subchannel and the overall bandwidth are exemplary purpose only.

A bandwidth of 40 MHz can be supported in the IEEE 802.11n using a primary channel and a secondary channel. A VHT AP may support an extension channel. An extension channel may have at least 40 MHz bandwidth. A VHT STA informs the VHT AP of the availability of a secondary channel and an extension channel. If the VHT STA does not support an extension channel, the VHT AP and a high throughput (HT) AP operates in the same manner. If the VHT STA supports an extension channel only, and a bandwidth of the extension channel is 40 MHz, the VHT STA can use a bandwidth of 20 MHz, 40 MHz or 60 MHz according to the availability of the extension channel. If the VHT STA supports both a secondary channel and an extension channel, the VHT STA can use a bandwidth of 20 MHz, 40 MHz, 60 MHz and 80 MHz.

Figure 2:
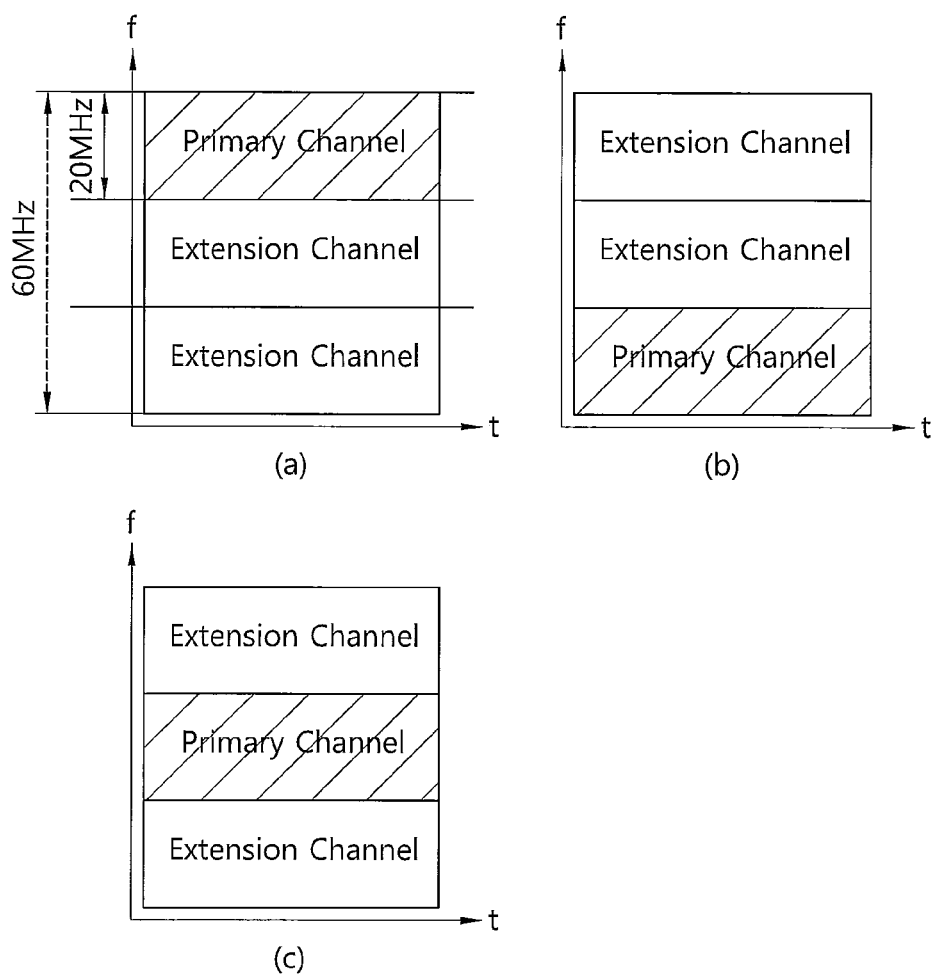
FIG. 2 illustrates exemplary channel management that combines three subchannels to support a bandwidth of 60 MHz.

FIG. 2 illustrates exemplary channel management that combines three subchannels to support a bandwidth of 60 MHz.

Referring to FIG. 2, the three subchannels include a primary channel and two extension channels. The primary channel is set in order to secure backward compatibility with STAs (hereinafter referred to as legacy STAs) supporting standards of lower than IEEE 802.11n using a bandwidth of 20 MHz. Legacy STAs supporting 20 MHz use the primary channel preferentially. STAs supporting 40 MHz or 60 MHz can use the primary channel, two extension channels and/or a combination thereof.

Subfigure (a) of FIG. 2 shows that the extension channels using 20 MHz are located in a frequency band lower than the primary channel. Here, the two 20 MHz extension channels can be set as a single 40 MHz extension channel. Subfigure (b) of FIG. 2 shows that the two extension channels are located in a frequency band higher than the primary channel. The two 20 MHz extension channels can be set as a single 40 MHz extension channel. Subfigure (c) of FIG. 2 shows that the primary channel is located between the two extension channels.

In (a) and (b) of FIG. 2, the multiple channels can be administrated by using the primary channel and the single 40 MHz extension channel contiguous to the primary channel. In (c) of FIG. 2, the multiple channels can be administrated by the primary channel and two 20 MHz extension channels contiguous to the primary channel.

An AP can set a subchannel among overall available channels as a primary channel and use the primary channel as a common channel for control signal. The AP can set a bandwidth of an extension channel to one of 20 MHz, 40 MHz and 60 MHz according to channel availability if a STA supports the extension channel.

Figure 3:
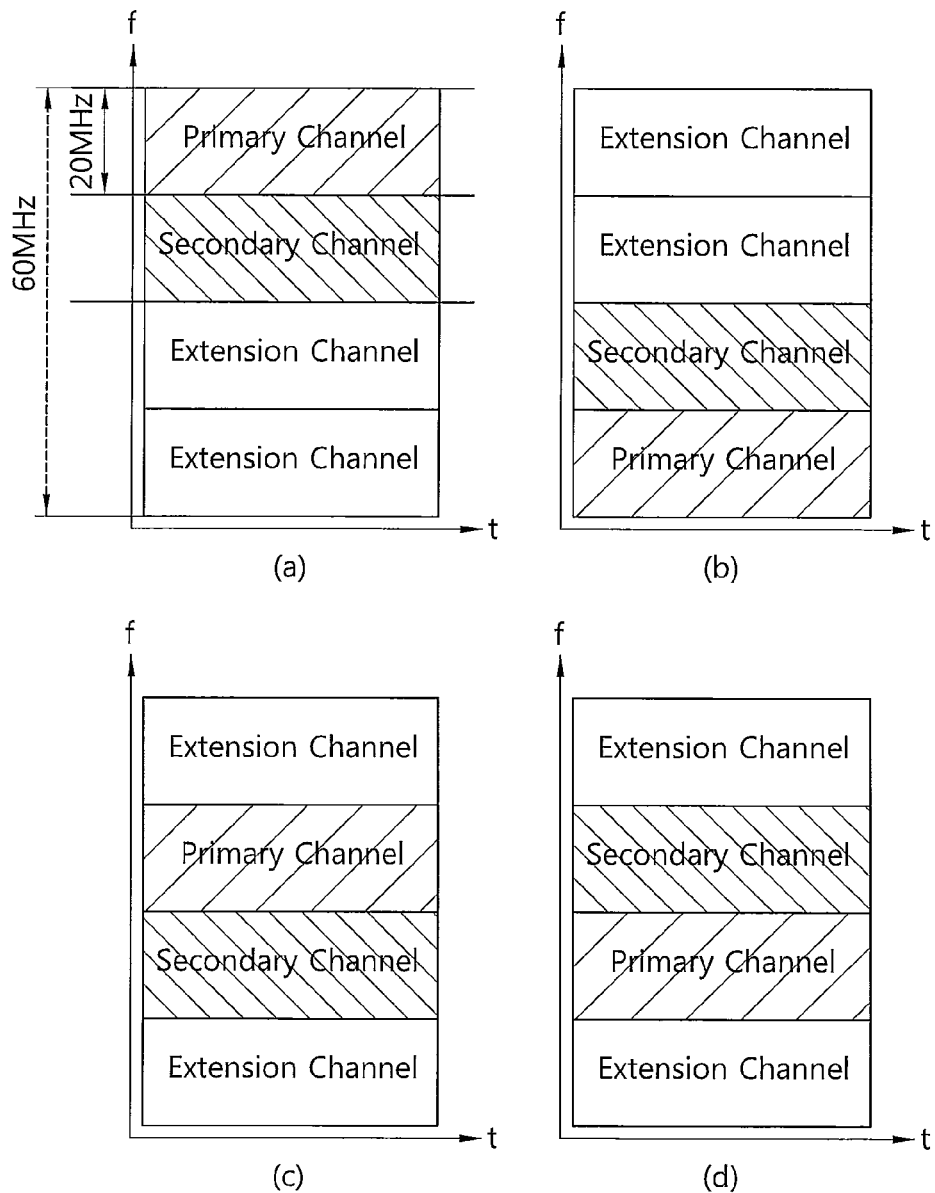
FIG. 3 illustrates exemplary channel management that combines four subchannels to support a bandwidth of 80 MHz.

FIG. 3 illustrates exemplary channel management that combines four subchannels to support a bandwidth of 80 MHz.

Referring to FIG. 3, the four subchannels include a primary channel, a secondary channel and two extension channels. The primary channel and the secondary channel are set in order to secure backward compatibility with legacy STAs supporting standards of lower than IEEE 802.11n using 40 MHz. Legacy STAs supporting 20 MHz preferentially use the primary channel and use the secondary channel when the primary channel is being used. Legacy STAs supporting 40 MHz preferentially use the primary channel and the secondary channel. STAs supporting bandwidths higher than 60 MHz can use the primary channel, the secondary channel, the extension channels and/or a combination thereof.

Subfigure (a) of FIG. 3 shows that the extension channels having 20 MHz are located in a frequency band lower than the primary channel and the secondary channel. The primary channel is located in the highest band and the secondary channel is located below the primary channel. Here, the two 20 MHz extension channels can be set as a single 40 MHz extension channel. Subfigure (b) of FIG. 3 shows that the 20 MHz extension channels are located in a frequency band higher than the primary channel and the secondary channel. The primary channel is located in the lowest band and the secondary channel is located above the primary channel. Here, the two 20 MHz extension channels can be set as a single 40 MHz extension channel. Subfigure (c) of FIG. 3 shows that the primary channel and the secondary channel are located between the two extension channels. The primary channel is located in a band higher than the secondary channel. Subfigure (d) of FIG. 3 shows that the primary channel and the secondary channel are located between the two extension channels. The primary channel is located in a band lower than the secondary channel.

In (a) and (b) of FIG. 3, the multiple channels can be administrated by using the primary channel, the secondary channel and a extension channel having 40 MHz. In (c) and (d) of FIG. 3, the multiple channels can be administrated by using the primary channel, the secondary channel and two extension channels each having 20 MHz.

Figure 4:
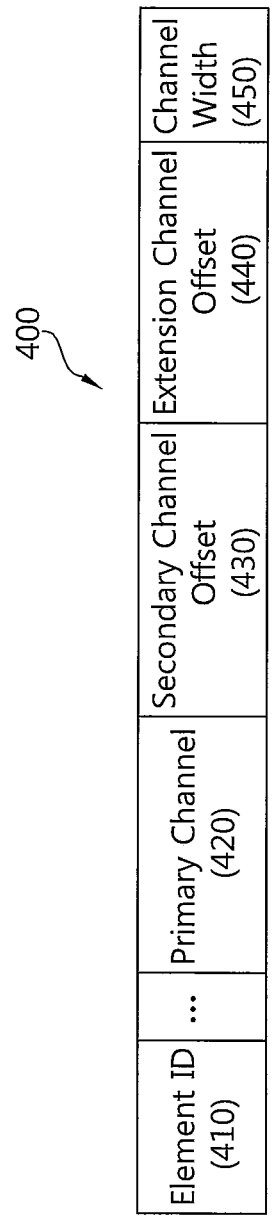
FIG. 4 illustrates an exemplary format of an operation element for setting up multiple channels.

FIG. 4 illustrates an exemplary format of an operation element for setting up multiple channels. An operation element 400 for setting multiple channels includes an element ID 410, a primary channel field 420, a secondary channel offset field 430, an extension channel offset field 440 and a channel width field 450. The element ID 410 is an identifier for identifying the operation element 400. The primary channel field 420 indicates the position of a primary channel in the available bandwidth of a system and can be represented as a channel number. The secondary channel offset field 430 indicates the offset of the secondary channel relative to the primary channel. The secondary channel offset field 430 can be configured as represented by Table 1.

TABLE 1

| Value | Name | Description |
|---|---|---|
| 0 | SCN (No Secondary Channel) | No secondary channel is present. |
| 1 | SCA (Secondary Channel Above) | The secondary channel is above the primary channel. |
| 3 | SCB (Secondary Channel Below) | The secondary channel is below the primary channel. |

The extension field offset field 440 indicates the position of an extension channel relative to the primary channel and/or the secondary channel. The value of the extension channel offset field 440 can be set based on the primary channel, as represented by Table 2.

TABLE 2

| Value | Name | Description |
| --- | --- | --- |
| 0 | ECN (No Extension Channel) | Indicates that no extension channel is present |
| 1 | ECA (Extension Channel Above) | Indicates that the extension channels are above the primary channel |
| 2 | ECB (Extension Channel Below) | Indicates that the extension channels are below the primary channel |
| 3 | ECC (Extension Channel Cross) | Indicates that the extension channels are cross the primary channel |
| 4-255 | | Reserved |

The channel width field 450 represents a channel bandwidth supported by a STA or a channel bandwidth used for transmission. The STA can support at least one of bandwidths 20 MHz, 40 MHz, 60 MHz and 80 MHz.

Though Table 2 shows that the extension channel offset field 440 indicates the position of the extension channel based on the primary channel, the extension channel offset field 440 may indicate the position of the extension channel based on the secondary channel or based on a combination of the primary channel and the secondary channel.

The terms and values represented in Tables 1 and 2 are exemplary and those who skilled in the art can easily change the terms and values. In addition, all the aforementioned fields are not included in the operation element 400. Some of the fields may be omitted or other fields may be added. For example, the operation element 400 may not include the secondary channel offset field 430 if the secondary channel is not used.

The operation element 400 may be included in at least one of a beacon frame, a probe response frame and an association response frame and transmitted from an AP to a STA. Above frames may be referred to section 7.2.3 of IEEE standard P802.11-REVma/D9.0 "Wireless LAN Medium Access Control (MAC) and physical layer (PHY) specifications" which is hereby incorporated by reference.

An AP that classifies 60 MHz, 80 MHz or wider bandwidth as a primary channel, a secondary channel and an extension channel and manages the channels is required to change a channel previously allocated thereto in consideration of channel status. For example, if considerable noise is generated or/and interference with other signals occurs in a subchannel used as a primary channel in the overall channel bandwidth, another subchannel is updated to the primary channel to efficiently manage a WLAN system.

Figure 5:
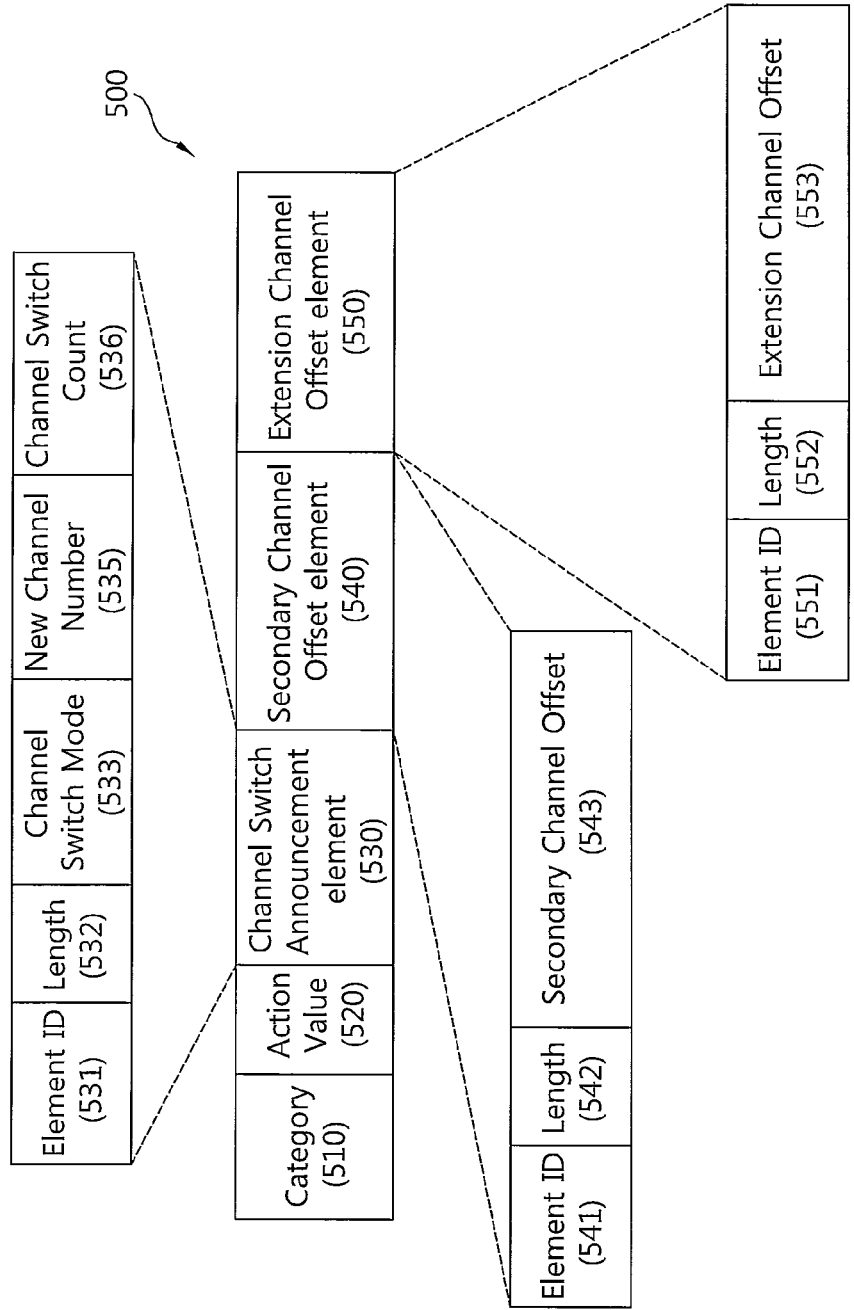
FIG. 5 illustrates an exemplary channel switch announcement frame for changing a channel.

FIG. 5 illustrates an exemplary channel switch announcement frame for changing a channel.

Referring to FIG. 5, a channel switch announcement frame 500 is used by an AP in a BSS or a STA in an IBSS to advertise when it is changing to a new channel. The channel switch announcement frame 500 includes a category field 510, an action value field 520, a channel switch announcement element field 530, a secondary channel offset element field 540, and an extension channel offset element field 550. The category field 510 may represent spectrum management. The action value field 520 may represent a channel switch announcement frame.

The channel switch announcement element field 530 includes an element ID 531, a length field 532, a channel switch mode field 533, a new channel number field 535 and a channel switch count field 536. The channel switch mode field 533 indicates any restrictions on transmission until a channel switch. An AP in a BSS or a STA in an IBSS may set the channel switch mode field 533 to either 0 or 1 on transmission. The channel switch mode field 533 set to 1 means that the STA in a BSS to which the frame containing the element is addressed transmits to further frames within the BSS until the scheduled channel switch. The channel switch mode field 533 set to 0 does not impose any requirement on the receiving STA. The new channel number field 535 is set to the number of the channel to which the STA is moving. The channel switch count field 536 either is set to the number of target beacon transmission times (TBTTs) until the STA sending the channel switch announcement element switches to the new channel or it set to 0. A value of 1 indicates that the switch shall occur immediately before the next TBTT. A value of 0 indicates that the switch occurs at any time after the frame containing the element is transmitted.

The secondary channel offset element field 540 includes an element ID 541, a length field 542 and a secondary channel offset field 543. The secondary channel offset element field 540 represents information on a new secondary channel when the secondary channel is changed to the new secondary channel. The secondary channel offset field 543 may be set as represented by Table 1.

The extension channel offset element field 550 includes an element ID 551, a length field 552 and an extension channel offset field 553 and represents information on a new extension channel when the extension channel is changed to the new extension channel. The extension channel offset field 553 may be set as represented by Table 2.

Figure 6:
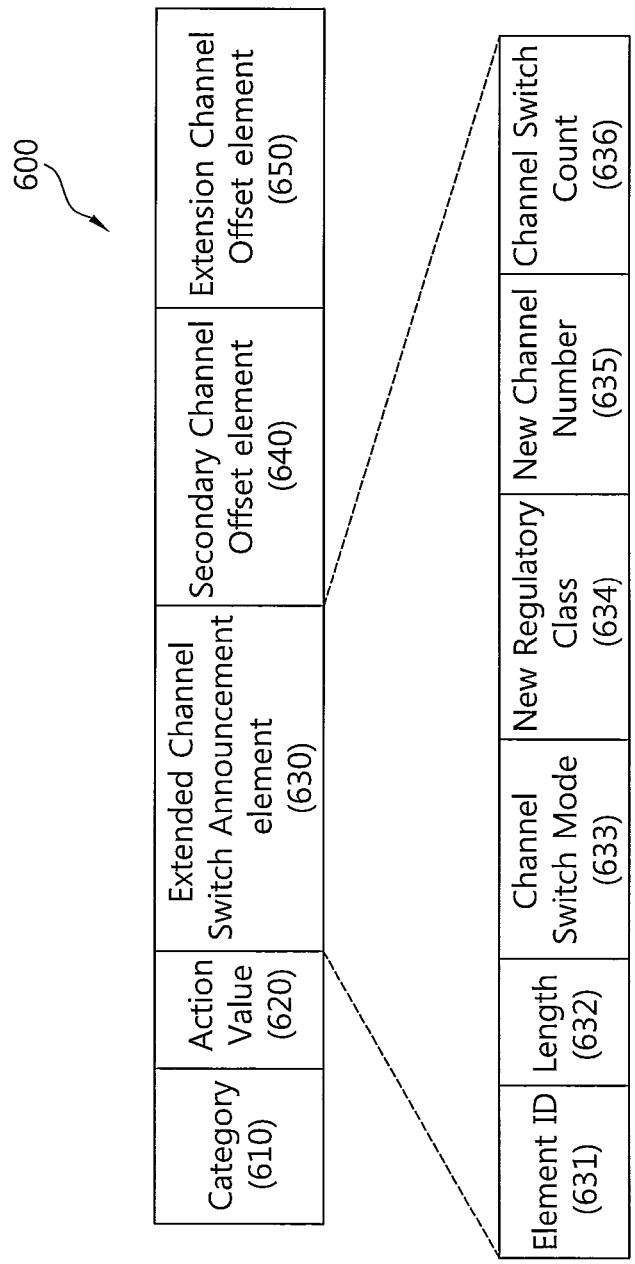
FIG. 6 illustrates an exemplary extended channel switch announcement frame.

FIG. 6 illustrates an exemplary extended channel switch announcement frame.

Referring to FIG. 6, an extended channel switch announcement frame 600 is used by an AP in a BSS or a STA in an IBSS to advertise when it is changing to a new channel or a new channel in a new regulatory class. The extended channel switch announcement frame 600 includes a category field 610, an action value field 620, an extended channel switch announcement element field 630, a secondary channel offset element field 640 and an extension channel offset element field 650.

Compared with the channel switch announcement frame 500 in FIG. 5, the extended channel switch announcement frame 600 includes the extended channel switch announcement element field 630 which further includes a new regulatory class field 634. The new regulatory class field 634 is set to the number of the regulatory class after the channel switch. A new channel number field 635 is set to the number of the channel after the channel switch. The channel number is a channel from the STA's new regulatory class.

The secondary channel offset element field 640 and the extension channel offset element field 650 can be set in the same manner in which the secondary channel offset element field 540 and the extension channel offset element field 550 of the channel switch announcement frame 500 shown in FIG. 5 are set.

Hereinafter, a direct link setup procedure in a TDLS wireless network will be described now.

A direct link setup (DLS) between the non-AP STAs supporting Quality of Service (QoS) has been introduced to improve the efficiency of wireless communications. Accordingly, in the BSS supporting the QoS, that is, in the QBSS including QoS STAs (QSTA) and QoS APs (QAP), the non-AP STAs can set up a direct link therebetween and directly communicate with each other through the direct link.

A TDLS (Tunneled Direct Link Setup) is a wireless communication protocol newly suggested to overcome such a limitation regarding the existing DLS service. The TDLS allows the QSTAs to set up a direct link in the currently used WLAN environments in accordance with the IEEE 802.11a/b/g. Accordingly, the TDLS defines methods of allowing the QSTAs to set up a direct link even in the BSS managed by the legacy AP. Hereinafter, a wireless network supporting the TDLS method is referred to as a TDLS wireless network.

It can be considered that the direct link setup procedure in the QBSS is similarly employed as the direct link setup procedure in the TDLS wireless network. According to the direct link setup procedure in the QBSS, the direct link setup procedure is completed by a two-way handshake between two QSTAs.

Figure 7:
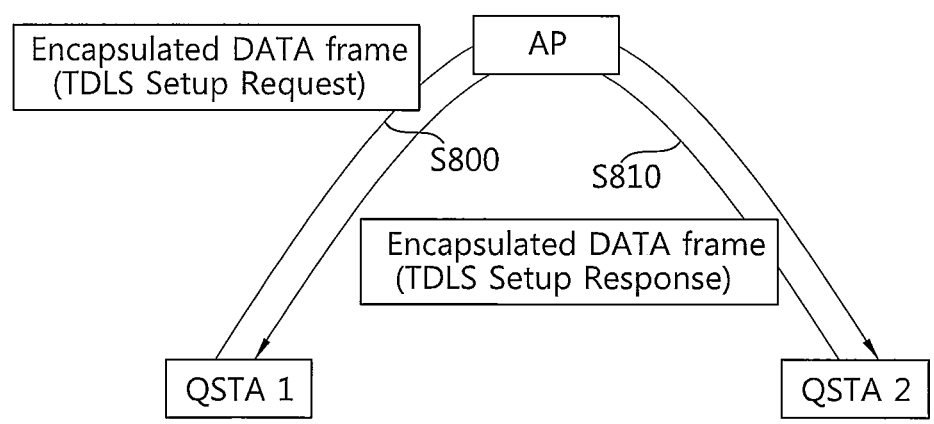
FIG. 7 is a diagram illustrating a flow of messages in a TDLS wireless network.

FIG. 7 is a diagram illustrating a flow of messages in a TDLS wireless network.

The TDLS wireless network system includes at least two non-AP QSTAs (QSTA1 and QSTA2) and a legacy AP not supporting the DLS procedure. For the purpose of convenient explanation in the following description, the non-AP QSTA initiating the direct link setup procedure, that is, transmitting the TDLS setup request frame, is called an initiating QSTA or a TDLS initiator and the non-AP QSTA related to the direct link setup procedure with the TDLS initiator or setting up a direct link thereto is called a peer QSTA.

Referring to FIG. 7, the first QSTA (QSTA1) as the TDLS initiator intending to set up a direct link to the second QSTA2 as the peer STA transmits to the second QSTA a request message for requesting for setting up a direct link (S800). The request message may be a TDLS setup request frame. The AP merely relays the request message received from the first QSTA to the second QSTA. The second QSTA having received the TDLS setup request frame transmits a response message to the first QSTA in response to the TDLS setup request frame (S810). The response message may be a TDLS setup response frame. In this case, the AP merely relays the response message received from the second QSTA to the first QSTA.

Hereinafter, a method of accessing a channel in a WLAN according to the present invention will be described.

FIG. 8 illustrates an exemplary extension channel offset information element according to an embodiment of the present invention.

Referring to FIG. 8, an extension channel offset element field 900 includes an element ID 910, a length field 920, a channel type filed 930, a channel center frequency segment 1 field 940, and a channel center frequency segment 2 field 950. The extension channel offset element field 900 may be included in a channel switch announcement frame described in FIG. 5 or an extended channel switch announcement frame described in FIG. 6. That is, the extension channel offset element field 900 may be modification of an extension channel offset element field 550 described in FIG. 5 or an extended channel offset element field 650 described in FIG. 6. Or, the extension channel offset element field 900 may be included the in a beacon frame or a probe response frame.

The channel type field 930 indicates composition of channels, which indicates that at least one allocated channel is either a single channel or multi-channels. If the channel type field is set to 0, it indicates that the at least one allocated channel is a single channel. The single channel may have one of a bandwidth of 20 MHz, 40 MHz, 80 MHz and 160 MHz. If the channel type field is set to 1, it indicates that at least one allocated channel are multiple channels. The multiple channels may be two discontinuous channels, and the two discontinuous channels have a bandwidth of 80 MHz respectively.

The channel center frequency segment 1 field 940 may indicate channel center frequency for a single channel if the channel type field 930 is set to 0. In this case, the channel center frequency segment 1 field 940 may be set to a channel number corresponding to the channel center frequency of the single channel. Or, the channel center frequency segment 1 field 940 may indicate channel center frequency of a segment 1 channel in multi-channels if the channel type field 930 is set to 1. In this case, the channel center frequency segment 1 field 940 may be set to a channel number corresponding to the channel center frequency of the segment 1 channel in the multi-channels the single channel.

The channel center frequency segment 2 field 950 may indicate channel center frequency of a segment 2 channel in the multi-channels if the channel type field 930 is set to 1. In this case, the channel center frequency segment 2 field 950 may be set to a channel number corresponding to the channel center frequency of the segment 2 channel in the multi-channels the single channel. If the channel type field 930 is set to 0, the channel center frequency segment 2 field 950 may not be defined.

Meanwhile, the extension channel offset information element in FIG. 8 may be applied to a TDLS wireless network system. The extension channel offset information element may be included in a TDLS channel switch request frame when a switch to an 80 MHz, 160 MHz or 80+80 MHz direct link is indicated. Switching to a 80 MHz/160 Mhz/80+80 MHz off-channel direct link may be achieved by including the following information in the TDLS channel switch request frame.

an operating class element indicating 40 MHz channel spacing
a secondary channel offset element indicating SCA or SCB
an extension bandwidth channel switch element indicating 80 MHz/160 MHz/80+80 MHz channel width The operating class has a value of 5 GHz for channel starting frequency.

Figure 9:
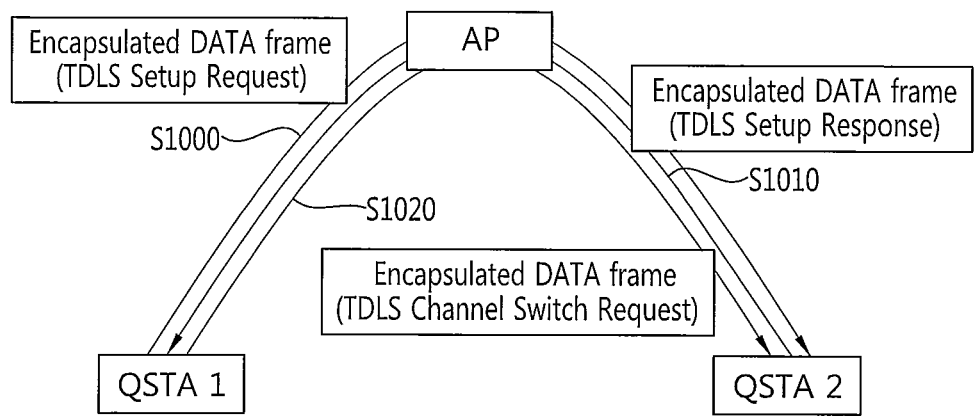
FIG. 9 illustrates an exemplary extension channel offset information element according to another embodiment of the present invention.

FIG. 9 illustrates an exemplary extension channel offset information element according to another embodiment of the present invention.

Referring to FIG. 9, the first QSTA (QSTA1) as the TDLS initiator intending to set up a direct link to the second QSTA2 as the peer STA transmits to the second QSTA a request message for requesting for setting up a direct link (S1000). The request message may be a TDLS setup request frame. The AP merely relays the request message received from the first QSTA to the second QSTA. The second QSTA having received the TDLS setup request frame transmits a response message to the first QSTA in response to the TDLS setup request frame (S1010). The response message may be a TDLS setup response frame. In this case, the AP merely relays the response message received from the second QSTA to the first QSTA. The first QSTA (QSTA1) as the TDLS initiator intending to switch a channel to a 80 MHz/160 MHz/80+80 MHz direct link as the peer STA transmits to the second QSTA a request message for requesting for switching a channel (S1020). The request message may be a TDLS channel switch request frame. The AP merely relays the request message received from the first QSTA to the second QSTA.

Figure 10:
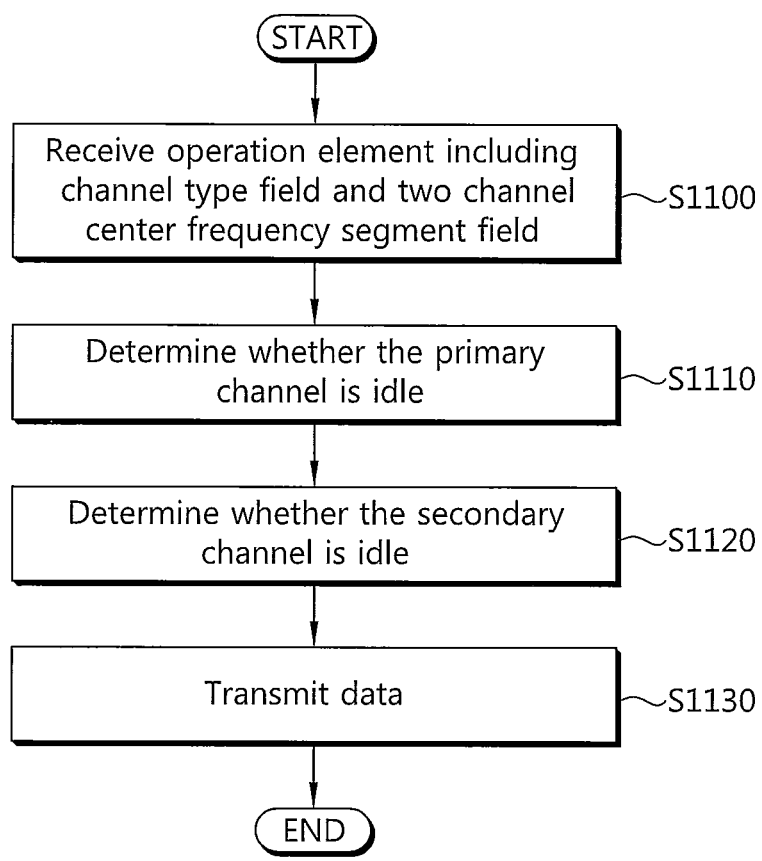
FIG. 10 illustrates a flowchart according to an embodiment of the present invention.

FIG. 10 illustrates a flowchart according to an embodiment of the present invention.

In step S1100, a STA receives an operation element for setting up or switching at least one channel from an AP. The operation element includes a channel type field indicating whether the at least one channel is either a single channel or multiple channels, and includes two channel center frequency segment fields indicating channel center frequency of a primary channel and a secondary channel respectively if the channel type field indicates that the at least one channel is multiple channels.

In step S1110, the STA determines whether the primary channel is idle during a first interval. The primary interval may immediately precedes the time at which a STA is permitted to begin a transmission opportunity (TXPO) and the SGA has at least one MAC service data unit (MSDU) pending for transmission for the AC of the permitted TXPO.

In step S1120, the STA determines whether the secondary channel is idle during a second interval if the primary channel is idle. The second interval may immediately precedes the start of the TXOP.

In step S1130, the STA transmits data by using the primary channel and the secondary channel to the AP or at least one station in a BSS if the primary channel and the secondary channel are idle.

Figure 11:
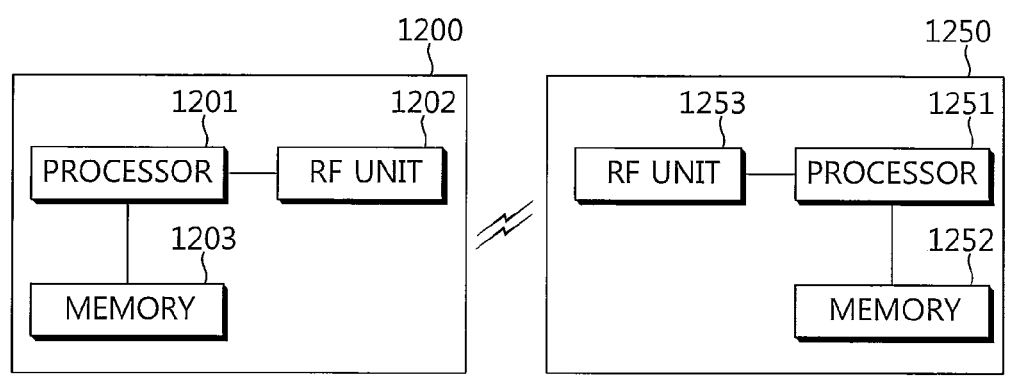
FIG. 11 is a block diagram of a wireless communication system to implement an embodiment of the present invention is implemented.

FIG. 11 is a block diagram of a wireless communication system to implement an embodiment of the present invention is implemented.

An AP 1200 includes a processor 1201, a memory 1202 and an radio frequency (RF) unit 1203. The processor 1201 implements a proposed function, process and/or method. The memory 1202 is operatively connected to the processor 1201 and stores information for operating the processor 1201. The RF unit 1203 is operatively connected to the processor 1201 and transmits and/or receives RF signals.

A STA 1250 includes a processor 1251, a memory 1252 and an RF unit 1253. The processor 1251 implements a proposed function, process and/or method. The memory 1252 is operatively connected to the processor 1251 and stores information for operating the processor 1251. The RF unit 1253 is operatively connected to the processor 1251 and transmits and/or receives RF signals.

The processors 1201, 1251 may include application-specific integrated circuit (ASIC), other chipset, logic circuit and/or data processing device. The memories 1202, 1252 may include read-only memory (ROM), random access memory (RAM), flash memory, memory card, storage medium and/or other storage device. The RF units 1203, 1253 may include baseband circuitry to process radio frequency signals. When the embodiments are implemented in software, the techniques described herein can be implemented with modules (e.g., procedures, functions, and so on) that perform the functions described herein. The modules can be stored in memories 1202, 1252 and executed by processors 1201, 1251. The memories 1202, 1252 can be implemented within the processors 1201, 1251 or external to the processors 1201, 1251 in which case those can be communicatively coupled to the processors 1201, 1251 via various means as is known in the art.

According to the present invention, an efficient channel access method can be provided.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of accessing a channel in a wireless local area network, the method comprising:
receiving, by a device, a channel switch announcement frame to advertise a channel switch from an access point (AP), the channel switch announcement frame including an operation element, the operation element including a channel type field, a first frequency segment field and a second frequency segment field, the channel type field indicating a use of two 80 MHz channels, the first frequency segment field indicating a center frequency of a primary 80 MHz channel, the second frequency segment field indicating a center frequency of a secondary 80 MHz channel, the primary 80 MHz channel not being contiguous with the secondary 80 MHz channel;
performing, by the device, backoff on the primary 80 MHz channel to obtain a transmission opportunity (TXOP);
determining, by the device, whether the secondary 80 MHz channel is idle during an interval immediately preceding the start of the TXOP only after the TXOP is obtained; and
transmitting, by the device, data by using the primary 80 MHz channel and the secondary 80 MHz channel to the AP during the TXOP if it is determined that the secondary 80 MHz channel is idle.

2. The method of claim 1, further comprising:
transmitting, by the device, data by using the primary 80 MHz channel to the AP during the TXOP if it is determined that the secondary 80 MHz channel is not idle.

3. A device for accessing a channel in a wireless local area network, the device comprising:
a radio frequency (RF) unit configured for transmitting or receiving a radio signal; and
a processor, coupled to the RF unit, and configured for:
receiving a channel switch announcement frame to advertise a channel switch from an access point (AP), the channel switch announcement frame including an operation element, the operation element including a channel type field, a first frequency segment field and a second frequency segment field, the channel type field indicating a use of two 80 MHz channels, the first frequency segment field indicating a center frequency of a primary 80 MHz channel, the second frequency segment field indicating a center frequency of a secondary 80 MHz channel, the primary 80 MHz channel not being contiguous with the secondary 80 MHz channel;
performing backoff on the primary 80 MHz channel to obtain a transmission opportunity (TXOP);
determining whether the secondary channel is idle during an interval immediately preceding the start of the TXOP only after the TXOP is obtained; and
transmitting data by using the primary 80 MHz channel and the secondary 80 MMhz channel to the AP during the TXOP if it is determined that that the secondary 80 MHz channel is idle.

* * * * *